Nov. 20, 1951  C. G. LYON  2,575,669
PROCESS FOR THE PRODUCTION OF GLAZING STRIPS
Filed Aug. 25, 1949

Inventor

Patented Nov. 20, 1951

2,575,669

UNITED STATES PATENT OFFICE 2,575,669

PROCESS FOR THE PRODUCTION OF GLAZING STRIPS

Charles Geoffrey Lyon, Winnipeg, Manitoba, Canada

Application August 25, 1949, Serial No. 112,241

3 Claims. (Cl. 154—132)

The invention relates to improvements in the production of sponge rubber glazing strips for windows and doors and a general object of the invention is to provide glazing strips of various sizes with a sponge rubber cushion surface of superior quality to those produced by other methods, and that, when nailed in position in a window with the sponge rubber surface against a pane of glass, will hold the pane of glass in a cushioned position, and thus reduce the breakage of glass and the infiltration of dust.

A more detailed object is to provide improvements in the process of production of sponge rubber glazing strips to permit the cutting of the sponge rubber cushion surface to the exact width of its backing material after the sponge rubber cushion surface has been adhered to the backing material of wood or metal.

A further object is to provide improvements in the process of production of the sponge rubber glazing strips to provide a stronger bond between the sponge rubber cushion surface and its backing material of wood or metal.

A further object is to provide improvements in the process of production of sponge rubber glazing strips to allow the application of stain or other finish to the backing material of a number of glazing strips at one time.

With other processes for the production of sponge rubber glazing strips the adherence of the sponge cushion strip to the backing material involves the difficulty of matching the two strips that have been individually cut beforehand. With the narrow single completed sponge rubber glazing strip it is not possible economically to apply pressure to improve the adhesive bond between the sponge rubber glazing strip and the strip of backing material. With the separate completed strips the costs of applying stains or other finish to the backing material are higher than by my process.

With the above more important objects in view the invention consists essentially in the process hereinafter described, reference being had to the accompanying drawing in which.

Figure 1:
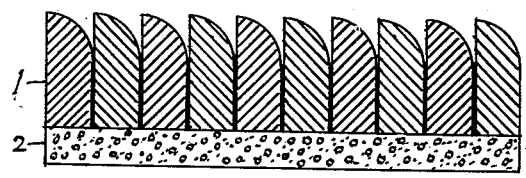
Fig. 1 is a sectional view of a sheet of sponge rubber 2 with one or more coatings of slow drying adhesive cement on its upward face and a group of parallel strips 1 of wood or metal adhered to the face of the sponge rubber sheet.
Figure 2:
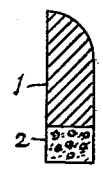
Fig. 2 is a sectional view of the completed sponge rubber glazing strip.
Figure 3:
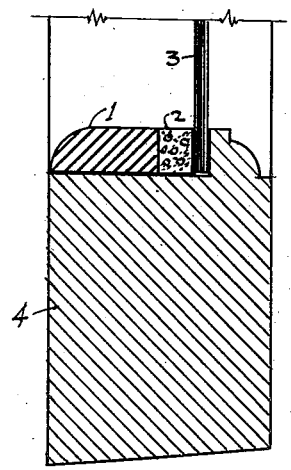
Fig. 3 is a sectional view of my completed sponge rubber glazing strip when nailed into position in a window sash 4 with the sponge rubber surface of the glazing strip against a pane of glass 3.

My process for the production of sponge rubber glazing strips consists of applying adhesive cements to a relatively long and wide sheet of sponge rubber 2 to provide a slow drying adhesive surface upon which strips of wood or metal 1 with adhesive or plain surfaces are applied in parallel groups.

When the sponge sheet is covered with strips pressure may be applied as required to assure a strong bond between the backing strips and the sponge rubber sheet.

Additional solvent for the adhesive cement may be spread on top of the backing strips to soak through the cracks between the strips to freshen the cement and to improve the adhesion between the strips and the sheet of sponge rubber as required.

When the adhesive cement has dried and the bond between the strips and the sheet of sponge rubber is secure the excess cement may be removed by chemical or physical means. Stain or other finish may then be applied to the backing strips. The ends may be trimmed as required.

The sponge rubber sheet may then be cut to the exact width of the backing strips of wood or metal as the backing strips are separated by using the cracks between the backing strips as a guide for the cutting blade.

The individual glazing strips are then nailed in position in a window sash 4 with the sponge rubber surface against a pane of glass 3 and will hold the pane of glass in a cushioned position, thus reducing breakage of the glass and the infiltration of dust.

What I claim as my invention is:

1. A process for the production of sponge rubber and wood glazing strips which consists of first adhering a group of relatively long and narrow parallel wood strips to the face of a sheet of sponge rubber to form a composite sheet of sponge rubber with many relatively long and narrow wood backing strips in a parallel compact group adhered to the face of the sponge rubber and then cutting individual sponge rubber and wood glazing strips therefrom by using the cracks between the wood strips to guide the blade cutting the sheet of sponge.

2. A composite sheet for the production of sponge rubber and wood glazing strips, consisting of a compact group of relatively long and narrow parallel wood backing strips adhered to the face of a sponge rubber sheet.

3. A relatively long and narrow sponge rubber and wood glazing strip produced from the composite sheet described in claim 2.

CHARLES GEOFFREY LYON.

REFERENCES CITED

The following references are of record in the file of this patent:

UNITED STATES PATENTS

| Number | Name | Date |
|---|---|---|
| 252,707 | Tanner | Jan. 24, 1882 |
| 690,241 | Day | Dec. 31, 1901 |
| 1,448,553 | Lucas | Mar. 13, 1923 |
| 1,558,143 | Browne | Oct. 20, 1925 |
| 1,931,309 | Thompson | Oct. 17, 1933 |
| 2,122,246 | Clewell | June 28, 1938 |
| 2,147,620 | Winkelmann et al. | Feb. 14, 1939 |
| 2,177,001 | Owen | Oct. 24, 1939 |
| 2,246,409 | Cheston | June 17, 1941 |
| 2,256,864 | Ferguson | Sept. 23, 1941 |
| 2,432,752 | Gray | Dec. 16, 1947 |
| 2,508,392 | Issaly | May 23, 1950 |